(12) United States Patent
Shimizu et al.

(10) Patent No.: US 6,573,625 B2
(45) Date of Patent: Jun. 3, 2003

(54) MOTOR DEVICE HAVING WATER-PROOF BRUSH HOLDER

(75) Inventors: Fumihiro Shimizu, Hamamatsu (JP); Hiroaki Yamamoto, Kosai (JP); Katsuhiko Torii, Hamamatsu (JP); Kenji Kashima, Toyohashi (JP); Kengo Yamamura, Inasa-gun (JP)

(73) Assignee: Asmo Co., Ltd., Shizuoka (JP)

( * ) Notice: Subject to any disclaimer, the term of this patent is extended or adjusted under 35 U.S.C. 154(b) by 29 days.

(21) Appl. No.: 09/818,623

(22) Filed: Mar. 28, 2001

(65) Prior Publication Data
US 2001/0026104 A1 Oct. 4, 2001

(30) Foreign Application Priority Data
Mar. 29, 2000 (JP) ........................................ 2000-091941
Aug. 1, 2000 (JP) ........................................ 2000-233022

(51) Int. Cl.⁷ .............................................. H02K 11/00
(52) U.S. Cl. ............................. 310/71; 310/43; 310/88; 310/239
(58) Field of Search ........................... 310/71, 43, 45, 310/89, 88, 98, 239

(56) References Cited

U.S. PATENT DOCUMENTS

| | | | | |
|---|---|---|---|---|
| 4,293,789 A | * | 10/1981 | King | 310/239 |
| 4,572,979 A | * | 2/1986 | Haar et al. | 310/68 R |
| 4,713,568 A | * | 12/1987 | Adam et al. | 310/112 |
| 5,025,184 A | * | 6/1991 | Sekine et al. | 310/71 |
| 5,159,221 A | * | 10/1992 | Miyazaki et al. | 310/239 |
| 5,164,625 A | * | 11/1992 | Hofmann et al. | 310/88 |
| 5,194,769 A | * | 3/1993 | Ade et al. | 310/51 |
| 5,309,053 A | * | 5/1994 | Ade | 310/71 |
| 5,444,315 A | * | 8/1995 | Adam et al. | 310/42 |
| 5,528,093 A | * | 6/1996 | Adam et al. | 310/89 |

* cited by examiner

Primary Examiner—Thanh Lam
(74) Attorney, Agent, or Firm—Posz & Bethards, P.C.

(57) ABSTRACT

In a motor device for vehicles, a brush holder is interposed between a motor yoke housing and a reduction gear unit housing has a holder body and a connector unit integrally formed with each other. The connector unit holds therein connector terminals having base ends connected to brushes. A sealing cover is molded integrally on the holder body and the base ends of the connector terminals. The sealing cover seals insides of the yoke housing and the gear housing water-tightly from the outside. The sealing cover is preferably made of rubber, elastomer or adhesive resin, and formed with the brush holder by two-color molding. The sealing cover has a cylindrical cover part extending from the connector unit, and the motor device is mounted in a vehicle door with the cylindrical cover part being attached to the vehicle door for electrical connection with an external power source.

45 Claims, 6 Drawing Sheets

MOTOR DEVICE HAVING WATER-PROOF BRUSH HOLDER

CROSS REFERENCE TO RELATED APPLICATION

This application is based on and incorporates herein by reference Japanese patent applications No. 2000-91941 filed Mar. 29, 2000 and 2000-233022 filed Aug. 1, 2000.

BACKGROUND OF THE INVENTION

The present invention relates to a water-proof motor device in which a brush holder and a connector unit are integrated.

U.S. Pat. No. 5,485,044 teaches an electric motor device in which a brush holder and a connector unit (connector unit) are integrated. This brush holder has a sealing cover at locations where the brush holder abuts a yoke housing and a gear housing, so that water is restricted from entering into the yoke housing and the gear housing. Since the connector unit is generally insert-molded with connector terminals, base ends of the connector terminals are not molded in the connector unit and are exposed outside. Thus, it is likely that water enters into the connector unit through the base ends and causes shorting between the connector terminals.

When the above motor device is used to drive a power window of a vehicle, the motor device is disposed outside an inner panel of a vehicle door with its connector unit being attached to the inner panel, so that the connector unit is electrically connected to an external power supply source through an opening of the inner panel of the door. A grommet is used to provide water tightness between the connector unit of the motor device and the opening in the inner panel of the door, thus requiring the grommet as an additional member for the motor device and additional assembling work.

SUMMARY OF THE INVENTION

It is therefore an object of the present invention to provide a water-proof motor device which restricts water from entering into a yoke housing, a gear housing and a connector unit.

It is another object of the present invention to provide a water-proof motor device which is suitable for mounting in a vehicle door.

According to the present invention, a motor device comprises a motor unit including a yoke housing, a motor-driven unit such as a reduction gear unit including a unit housing, and a brush holder interposed between the yoke housing and the unit housing. The brush holder has a holder body and a connector unit integrally formed with each other. The connector unit holds therein connector terminals having base ends connected to brushes. A sealing cover is molded integrally on the holder body and the base ends of the connector terminals. The sealing cover seals insides of the yoke housing and the gear housing water-tightly from the outside.

The sealing cover is preferably made of an elastic material such as rubber, elastomer or adhesive resin, and formed with the brush holder by two-color molding. The sealing cover has a cylindrical cover part extending from the connector unit, and the motor device is mounted in a vehicle door for driving a power window device of a vehicle with the cylindrical cover part being attached to the vehicle door for electrical connection with an external power source.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to various embodiments, which are directed to an electric motor device for a power window system for vehicles. In the following embodiments, the same reference numerals are used to designate the same or similar parts.

(First Embodiment)

Figure 1:
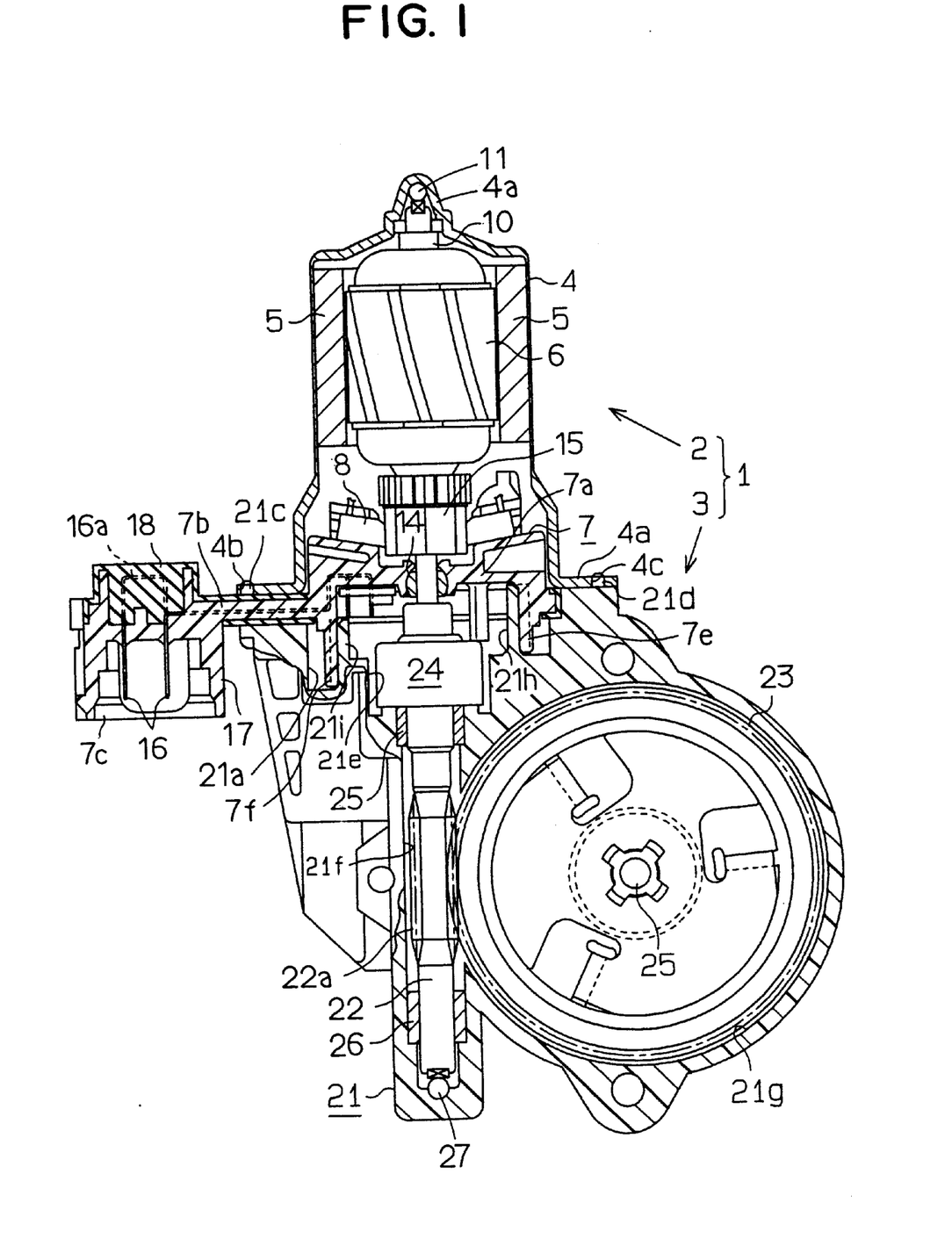
FIG. 1 is a sectional view showing a motor device according to a first embodiment of the present invention.

Referring first to FIG. 1, an electric motor device 1 is comprised of a motor unit 2 and a reduction gear unit 3. The motor unit 2 has a yoke housing 4, a plurality of magnets 5, an armature 6, a brush holder 7, brushes 8, a rotary shaft 10 and a commutator 15.

The yoke housing 4 is formed in a bottomed flat, cylindrical shape having an end 4a. Two magnets 5 are attached to the inner peripheral surfaces of the yoke housing 4 to face each other. The yoke housing 4 rotatably supports a base end of the rotary shaft 10 at its end 4a by a thrust-receiving ball 11. The rotary shaft 10 fixedly supports the armature 6 on its intermediate part to face the magnets 5, and the commutator 15 on its other end side opposite the base end.

The yoke housing 4 is formed with a flange 4a at its open end side so that the flange 4a extends outward in the radial direction and the circumferential direction. The flange 4a has through holes 4b and 4c at two opposite locations (left and right sides in FIG. 1). The brush holder 7 is firmly fit in the opening of the yoke housing 4.

Figure 2A:
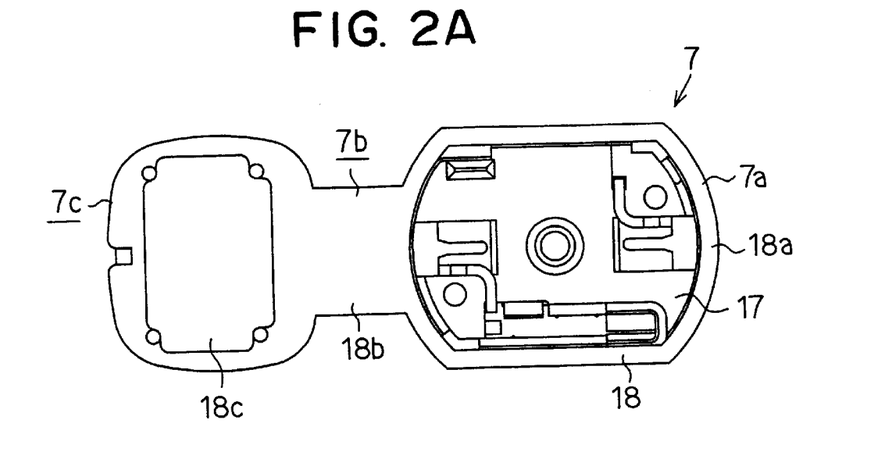
FIGS. 2A, 2B and 2C are a rear view, a side view and a front view of a brush holder of the motor device shown in FIG. 1.
Figure 2B:
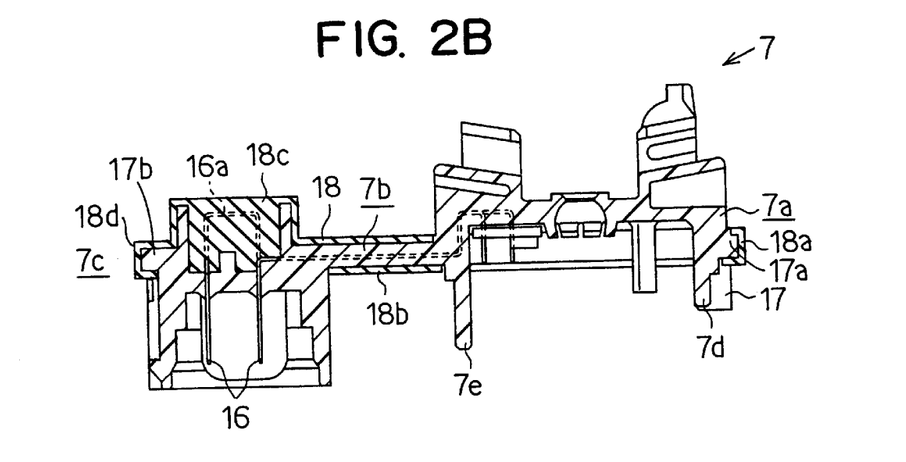
Figure 2C:
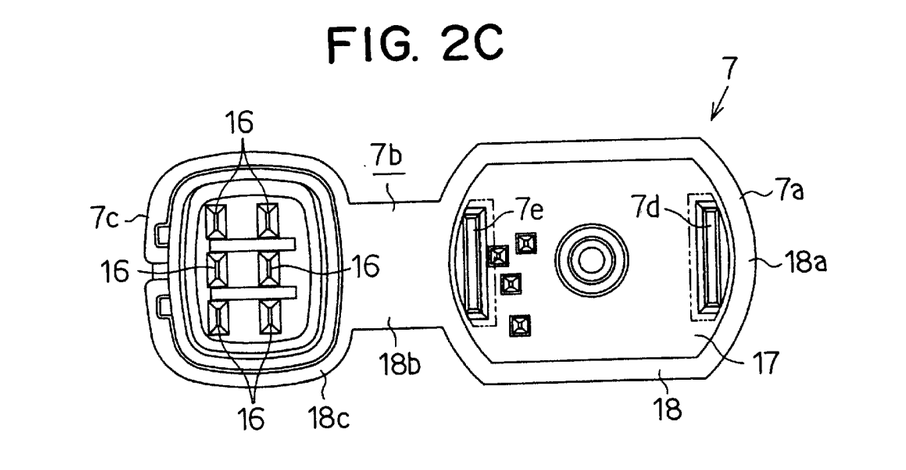

As shown in FIGS. 2A to 2C, the brush holder 7 is integrally formed with a holder body 7a, a connector unit 7c and a connecting bridge 7b. The holder body 7a is formed in a shape in correspondence with the opening of the yoke housing 4 thereby to cover and abut the circumferential periphery of the yoke opening. The connector unit 7c is provided as an electrical connector unit at the outside of the yoke housing 4 in the radial direction of the holder body 7a. The connecting bridge 7b extends in the radial direction from the holder body 7a to connect the holder body 7a and the connector unit 7c that extends along the flange 4a.

The holder body 7a has a pair of first protrusions 7e and 7f at the side of the reduction gear unit 3 (at the lower side of FIG. 1) as shown in FIG. 2B. The first protrusions 7e and 7f protrude in parallel with the rotary shaft 10 in a manner to face each other through the rotary shaft 10. The connector unit 7c is formed in a bottomed box-like shape opening in the downward direction in FIG. 1, and has a plurality of (six) connector terminals 16 therein. The terminals 16 have base ends 16a connected to brushes 8 and connectable to an external power source (not shown).

The pair of brushes 8 is connected to the connector unit 7c via electric conductors (shown with dotted lines) and disposed on the holder body 7a at the side of an inner space of the yoke housing 4. The brushes 8 are positioned near the commutator 15 and held in contact with the commutator 15. Thus, the armature 6 and the rotary shaft 10 of the motor unit 2 rotate when electric current is supplied to coil windings of the armature 6 through the brushes 8 and the commutator 15. A bearing 14 is attached to a generally central part of the holder body 7a to rotatably support the rotary shaft 10.

The brush holder 7 is comprised of a frame 17 made of resin and a sealing cover 18 made of rubber, elastomer or adhesive resin. The frame 17 provides an integral unit of the holder body 7a, the connecting bridge 7b and the connector unit 7c. The frame 17 has engagement ribs 17a and 17b as flanges protruding outward in the radial direction from the holder body 7a and the connector unit 7c, respectively, as shown in FIG. 2B. The ribs 17a and 17b are provided at the same elevation as the connecting bridge 7b. The sealing cover 18 is shaped to surround the outer peripheral surfaces of the frame 17.

Specifically, the sealing cover 18 is made as a single continuous member, and has a body cover part 18a, a bridge cover part 18b, a unit cover part 18c and a rib cover part 18d. The body cover part 18a covers the outer peripheral surface of the holder body 7a. The bridge cover part 18b covers the entire outer surfaces of the connecting bridge 7b. The unit cover part 18c covers the outer peripheral surface of the connector unit 7c and the base end sides of the terminals 16. The rib cover part 18d covers both outer surfaces of the engagement rib 17e that is formed around the base ends 16a of the terminals 16. The rib cover part 18d restricts the unit cover part 18c from being detached from the connector unit 7c. These parts 18a to 18e of the sealing cover 18 is preferably formed integrally with the frame 17, but may be formed separately. For example, the parts 18b and 18c may be formed separately.

The brush holder 7 is tightly fit in the opening of the yoke housing 4 together with the sealing cover 18 (body cover part 18a and bridge cover part 18b), so that the inside of the yoke housing 4 is held water-tightly from the outside. Further, because the unit cover part 18c covers the base ends 16a of the terminals 16, the inside of the connector unit 7c is held water-tightly from the outside and the terminals 16 are electrically insulated from one another. Further, because the bridge cover part 18b are sandwiched between the flange 4a of the yoke housing 4 and the reduction gear unit 3, water is restricted from entering into the insides of the yoke housing 4 and the connector unit 7c of the brush holder 7 through the connecting bridge 7b.

The reduction gear unit 3 has a gear housing 21, first and second bearings 25 and 26, a worm shaft 22, a worm wheel 23 and an output shaft 25. The gear housing 21 is made of resin, and its top end is fixed to the yoke housing 4 and the brush holder 7. Specifically, the gear housing 21 is formed with an open recess 21a at its top central part, and a pair of second engagement protrusions 21h and 21i in the bottom of the open recess 21a in correspondence with the first engagement protrusions 7e and 7f of the brush holder 7. The second engagement protrusions 21h and 21i also protrude in the axial direction of the rotary shaft 10 as the first engagement protrusions 7e and 7f do.

The gear housing 21 is also formed with a pair of fitting protrusions 21c and 21d on its top surface at locations opposite to each other with respect to the rotary shaft 10. The protrusions 21c and 21d are fit in through holes 4c and 4d formed in the flange 4a of the yoke housing 4 thereby to sandwich the brush holder 7 between the yoke housing 4 and the gear housing 21.

The gear housing 21 is also formed with a clutch accommodating recess 21e, a worm shaft accommodating recess 21f and a wheel accommodating recess 21g. The clutch accommodating recess 21e is provided in the central part of the bottom of the open recess 21a, and the worm shaft accommodating recess 21f extends from the bottom central part of the clutch accommodating recess 21e in the axial direction of the rotary shaft 10. The wheel accommodating recess 21g is provided adjacent to the worm shaft accommodating recess 21f in the radial direction of the rotary shaft 10, and is in communication with the worm shaft accommodating recess 21f.

A worm shaft 22 is coupled with the rotary shaft 10 though a clutch 24. This clutch 24 is for transmitting rotation of the rotary shaft 10 to the worm shaft 22 and stops transmitting the rotation of the worm shaft 22 to the rotary shaft 10. A sliding-type cylindrical bearings 25 and 26 are insert-fit in one and the other axial ends of the worm accommodating recess 21f (upper and lower sides in FIG. 1) to rotatably support the worm shaft 22 in the worm accommodating recess 21f. A ball 27 is provided in the worm shaft accommodating recess 21f to receive a thrust load of the worm shaft 22. The worm shaft 22 has a worm 25a at its intermediate part between the bearings 25 and 26, and is meshed with a worm wheel 23 accommodated in the worm wheel accommodating recess 21g. The worm wheel 23 is fixed to an output shaft 25, which is engaged with a power window driving device of a vehicle (not shown).

In assembling the yoke housing 4, the brush holder 7 and the gear housing 21, the brush holder 7 and the gear housing 21 are first assembled to each other by engaging the first protrusions 7e and 7f with the second protrusions 21h and 21i. In this instance, the peripheral side part and stepped part of the open recess 21a (right side in FIG. 1) abuts the outer peripheral part and the bottom surface part of the body cover part 18a of the sealing cover 18 (right side in FIG. 2b). Further, the top end surface of the gear housing 21 (left side in FIG. 1) abuts the lower surface of the bridge cover part 18b of the brush holder 7. Thus, the contact part between the gear housing and the brush holder 7 is held water-tightly.

This assembly is transferred to the yoke housing 4, and the protrusions 21c and 21d are inserted into the through holes 4b and 4c, respectively, thereby fixing the gear housing 21 and the brush holder 7 to the yoke housing 4. In this instance, the flange 4a of the yoke housing 4 abuts the top surfaces of the body cover part 18a and the bridge cover part 18b of the brush holder 7. Thus, the contact part between the yoke housing 4 and the brush holder 7 is held water-tightly.

In the first embodiment, the frame 17 and the sealing cover 18 of the brush holder 7 are formed by a two-color molding for molding different materials. As a result, the sealing cover 18 can be formed on the frame 17 integrally and tightly to improve its sealing ability and in reduced number of parts and costs. The sealing cover 18 not only water-tightly seals the inside spaces of the motor unit 2, the connector unit 7c and the gear housing 21 from the outside, but also absorbs vibrations of the motor device and reduces noise.

(Second Embodiment)

Figure 3:
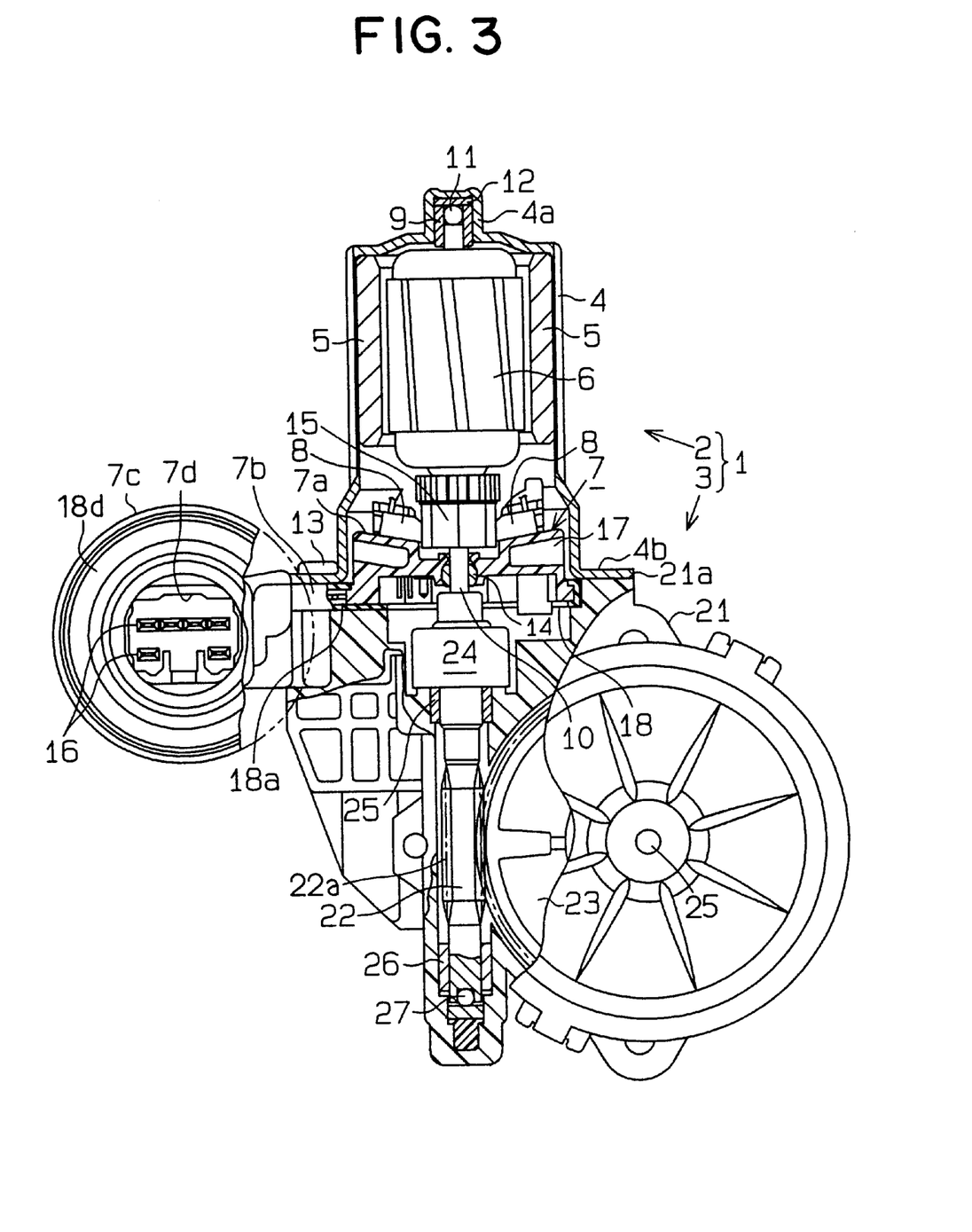
FIG. 3 is a sectional view showing a motor device according to a second embodiment of the present invention.

In a second embodiment, as shown in FIG. 3, the brush holder 7 is formed slightly differently from that in the first embodiment, so that the connector unit 7c and the reduction gear unit 21 are arranged in parallel. That is, the connector unit 7c is arranged with its central axis being in parallel with the central axis (output shaft 25) of the reduction gear unit 25. The yoke housing 4 and the reduction gear unit 21 are fixed to each other by screws 13.

Figure 5A:
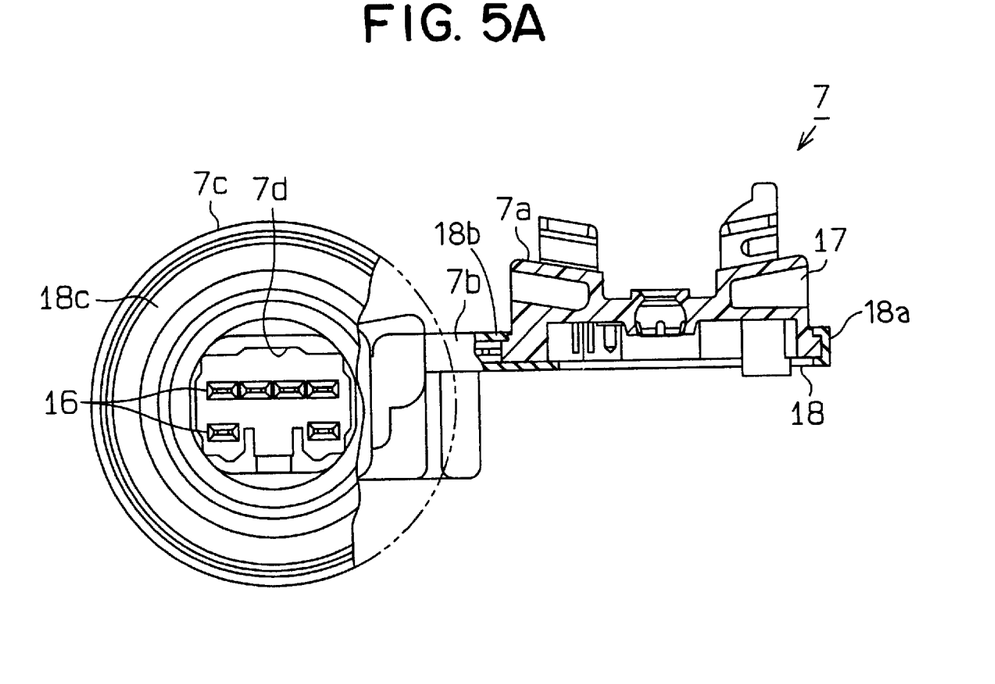
FIGS. 5A and 5B are a side view and a front view of a brush holder of the motor device shown in FIG. 3.
Figure 5B:
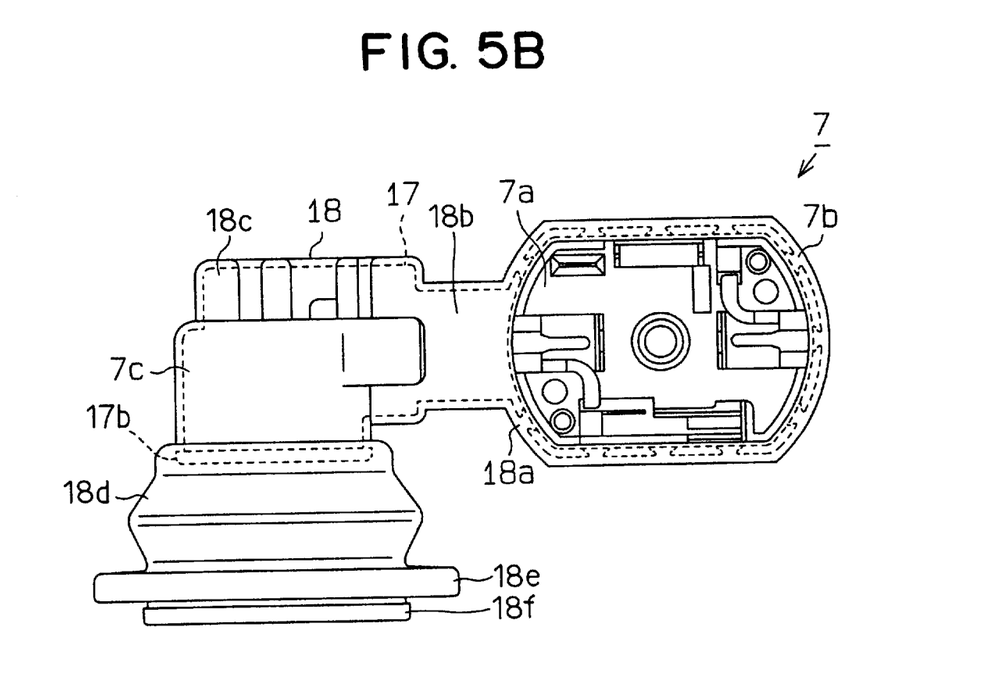

Specifically, as shown in FIGS. 5A and 5B, the brush holder 7 have the holder body 7a, the connecting bridge 7b and the connector unit 7c. The connector unit 7c is formed to extend perpendicularly from the connecting bridge 7b, and has a connecting recess 7e to receive the connector terminals 16 therein for connection with an external power source and various sensors (not shown). The frame 17 and the sealing cover 18 are formed in the two-color molding process in the same manner as in the first embodiment.

Figure 6A:
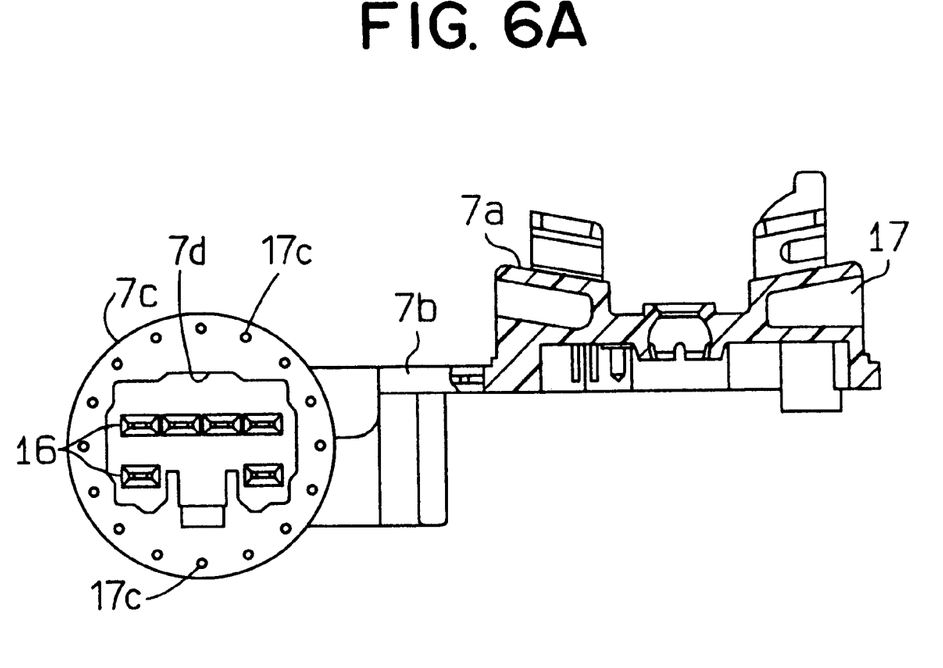
FIGS. 6A and 6B are a side view and a front view of the brush holder shown in FIGS. 5A and 5B before molding of a sealing cover.
Figure 6B:
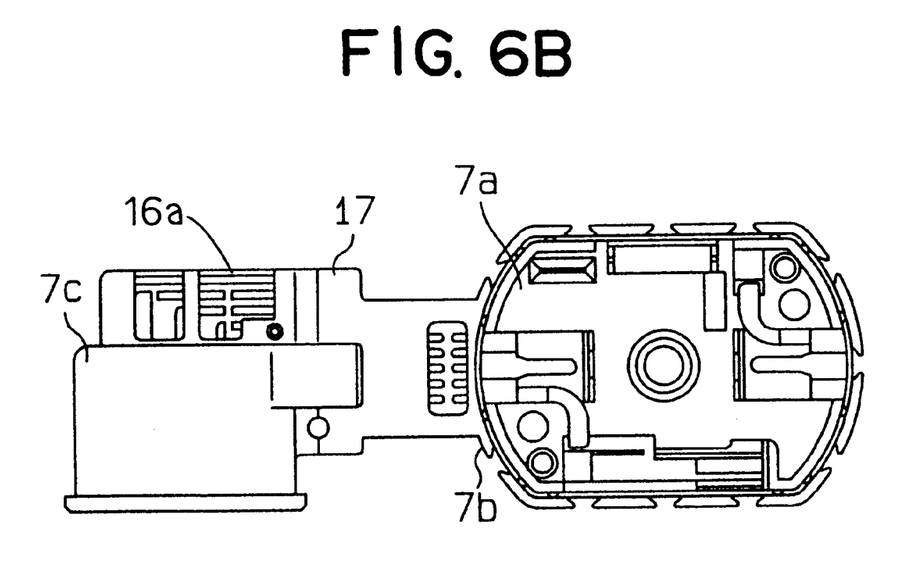

Specifically, the connector unit 7c has the rib 17b shaped annularly as a flange outside the connecting recess 7e. The rib 17b protrudes outward in a perpendicular relation to the terminals 16. The sealing cover 18 has the body cover part 18a, the bridge cover part 18b and the unit cover part 18c. The sealing cover 18 also has a cylindrical cover part 18d. The cylindrical cover part 18d is continuously formed with the unit cover part 18c, which covers the base ends 16a of the terminals 16. The cylindrical cover part 18d extends beyond the rib 17b and has a top flange 18e and a top end 18f as shown in FIG. 5B. A plurality of engagement parts (holes or protrusions) 17c is provided on the bottom surface of the rib 17b as shown in FIG. 6A, so that a part of the elastic material of the cylindrical cover part 18d is affixed to the engagement parts 17c when molded. Thus, the cylindrical cover part 18d is not detached from the connector unit 7c.

Although not shown, the flange 17b may be replaced with an enlarged part that has an inner diameter larger than that of the connecting recess 7d and extends toward the flange 18e and the top end 18f. In this instance, the enlarged part should also extend in the radial direction of the cylindrical cover part 18d toward the large diameter part of the cylindrical cover part 18d, so that the cylindrical cover part 18d does not detach from the connector unit 7c.

Figure 4:
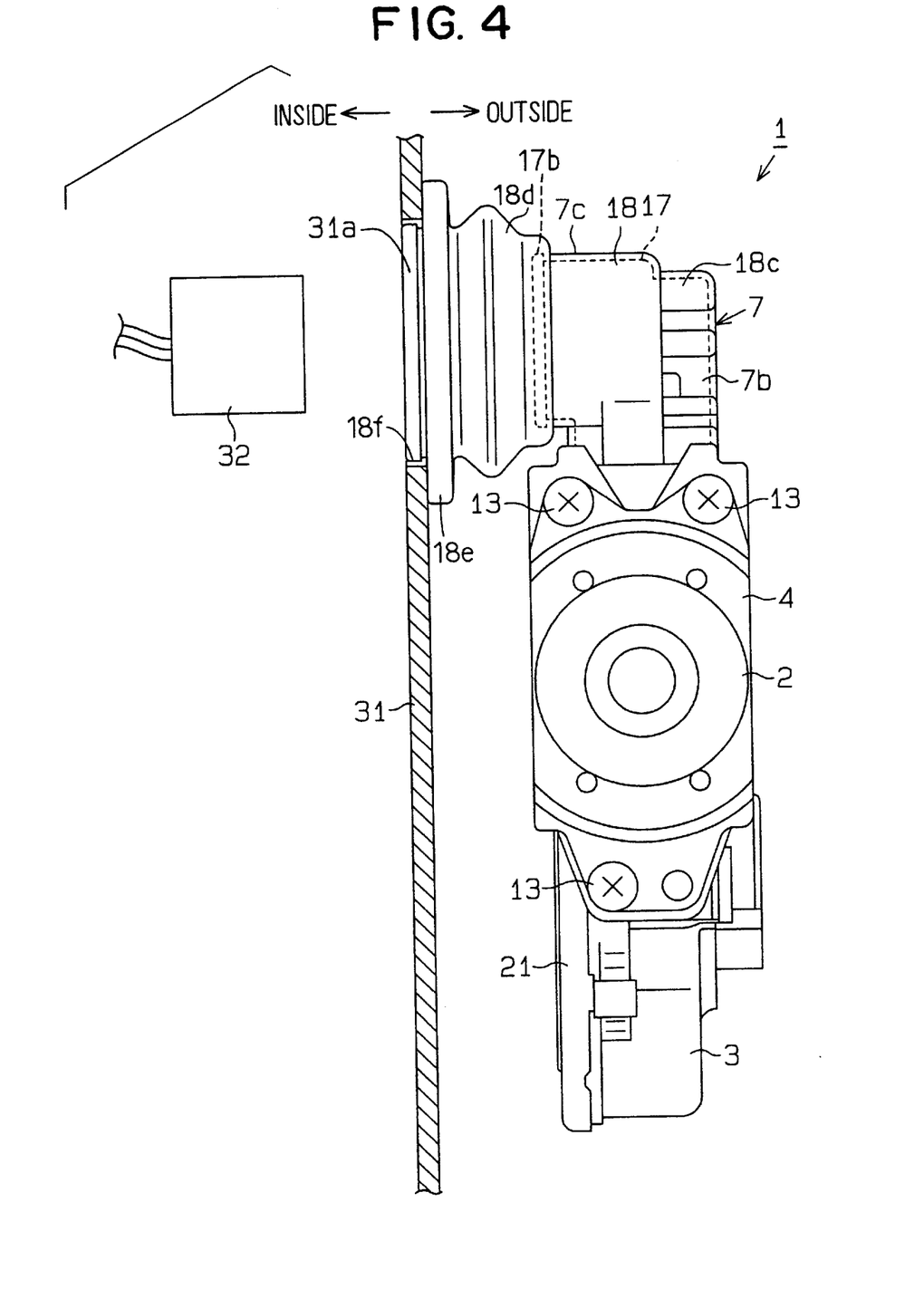
FIG. 4 is a sectional view showing the motor device according to the second embodiment attached to a vehicle door.

As shown in FIG. 4, an inner panel 31 of a vehicle door is formed with an insertion hole 31a. The motor device 1 is positioned outside the inner panel 31, that is, between the inner panel 31 and an outer panel (not shown). This space is more likely to be subjected to water. The motor device 1 is fixed to the inner panel 31 with screws (not shown). In this instance, the cylindrical cover part 18d is attached to the insertion hole 31a. That is, the top flange 18e abuts the surface of the inner panel 31 (left surface in FIG. 4), and the top end 18f are fit in the insertion hole 31a. The cylindrical cover part 18d thus entirely covers the insertion hole 31a so that the connecting recess 7d of the connector unit 7c is communicated with the inside space of the inner panel 31.

A vehicle-side connector unit (electric power supply unit) 32 connected to the power source of the vehicle is inserted from the inside of the inner panel 31 into the connecting recess 7d through the insertion hole 31a and the cylindrical cover part 18d. As a result, the connecting part between the connector units 7c and 32 is held free of water which may enter into the outside space of the inner panel 31 where the motor device 1 is located. Further, the top flange 18e and the top end 18f, which are elastic and abuts the inner panel 31 tightly, restrict water from entering from the outside space into the inside space through the insertion hole 31a of the inner panel 31.

The second embodiment provides the similar advantages of the first embodiment. Further, the cylindrical cover part 18d protects the connector terminals 16 from water entering the outside of the inner panel. It also the restricts water from entering from the outside into the inside of the inner panel 31 through the insertion hole 31a, thus protecting the connector terminals 16 from water entering from the inside of the inner panel 31 through the insertion hole 31a and the cylindrical cover part 18d.

(Modification)

The above embodiments may be modified in many other ways. For instance, the rotary shaft 10 and the worm shaft 22 may be coupled directly or formed in a single shaft without using the clutch 24. The sealing cover 18 may be separately made without using the two-color molding process, and the sealing cover 18 may be attached to the frame 17. The cylindrical cover part 18d (second embodiment) may be formed separately from the other cover parts 18a, 18b and 18c. In the brush holder 7, the rib 17a may be shaped to protrude more in the radial direction, so that the flange 4a of the yoke housing 4 may contact the top surface of the rib 17a of the brush holder 7 over wider surface area to provide more sealing ability by the body cover part 18a. The open recess 21a of the gear housing 21 may be shaped to be used as the worm accommodating recess 21f.

What is claimed is:

1. A motor device comprising:
   a rotary shaft fixedly supporting an armature and a commutator thereon;
   brushes held in contact with the commutator;
   a yoke housing having an opening and rotatably supporting the rotary shaft;
   a gear housing having an opening facing the opening of the yoke housing and rotatably supporting the rotary shaft;
   a brush holder having a holder body and a connector unit integrally formed with each other, the holder body being interposed between the yoke housing and the gear housing, the connector unit holding connector terminals that have base ends connected to the brushes; and
   a sealing cover continuously molded on the holder body and the base ends of the connector terminals thereby to seal insides of the yoke housing and the gear housing from an outside and the base ends of the connector terminals.

2. The motor device as in claim 1, wherein:
   the brush holder is made of a resin;
   the sealing cover is made of a material different from that of the brush holder; and
   the brush holder and the sealing cover are formed by two-color molding.

3. The motor device as in claim 1, wherein:
   the sealing cover is made of one of rubber, elastomer and adhesive resin.

4. A motor device comprising:
   a rotary shaft fixedly supporting an armature and a commutator thereon;
   brushes held in contact with the commutator;
   a yoke housing having an opening and rotatably supporting the rotary shaft;
   a gear housing having an opening facing the opening of the yoke housing and rotatably supporting the rotary shaft;

a brush holder having a holder body and a connector unit integrally formed with each other, the holder body being interposed between the yoke housing and the gear housing, the connector unit holding connector terminals that have base ends connected to the brushes; and a sealing cover molded on the holder body and the base ends of the connector terminals with a same elastic material thereby to seal insides of the yoke housing and the gear housing from an outside and the base ends of the connector terminals.

5. The motor device as in claim 1, wherein:

the sealing cover is made of one of rubber, elastomer and adhesive resin.

6. A motor device comprising:

a rotary shaft fixedly supporting an armature and a commutator thereon;

brushes held in contact with the commutator;

a yoke housing having an opening and rotatably supporting the rotary shaft;

a gear housing having an opening facing the opening of the yoke housing and rotatably supporting the rotary shaft;

a brush holder having a holder body and a connector unit integrally formed with each other, the holder body being interposed between the yoke housing and the gear housing, the connector unit holding connector terminals that have base ends connected to the brushes; and sealing covers separately molded on the holder body and the base ends of the connector terminals thereby to seal insides of the yoke housing and the gear housing from an outside and the base ends of the connector terminals.

7. A motor device for a power window of a vehicle that has an inner panel of a door, the inner panel having an insertion hole through which a vehicle-side connector unit is inserted, the motor device comprising:

a motor unit including brushes and a yoke housing that has an open end;

a gear unit including a gear housing that has an open end facing the open ends of the yoke housing;

a brush holder frame including a body part for holding the brushes thereon, a bridge part interposed between the open ends of the yoke housing and the gear housing, and a motor-side connector unit having a holding part and a connecting recess for receiving the vehicle-side connector unit through the insertion hole, wherein the body part, the bridge part and the motor-side connector unit are formed integrally as a single member; and a sealing cover including a unit cover part covering the motor-side connector unit and a cylindrical cover part covering the holding part and formed in a cylindrical shape so that the connecting recess is open to an inside of the inner panel through the insertion hole, wherein the unit cover part and the cylindrical cover part are formed continuously and integrally molded with the brush holder frame.

8. The motor device as in claim 7, wherein:

the sealing cover further includes a body cover part covering the body and a bridge part covering the connecting bridge; and the body cover part, the bridge part, the unit cover part and the cylindrical part are molded without discontinuity.

9. The motor device as in claim 7, wherein:

the sealing cover is made of one of a rubber, elastomer and adhesive resin.

10. The motor device as in claim 7, wherein:

the cylindrical cover part of the sealing cover is fit in the insertion hole of the inner panel.

11. The motor device as in claim 8, wherein:

the body and the connecting bridge are provided in correspondence with entire circumferences of the open ends of the yoke housing and the gear housing; and the body cover part and the bridge part are provided on the body and the connecting bridge to abut the entire circumferences of the open ends of the yoke housing and the gear housing.

12. The motor device as in claim 7, wherein:

the motor-side connector unit includes therein exposed connector terminals having respective ends connected to the brushes; and the unit cover part covers the respective ends of the connector terminals continuously with the cylindrical cover part.

13. The motor device as in claim 7, wherein:

the holding part is formed as a flange that extends perpendicularly to a direction of insertion of the vehicle-side connector unit near an opening of the motor-side connector unit.

14. The motor device as in claim 7, wherein:

the holding part is formed as an enlarged part having an inner diameter larger than a diameter of the connecting recess.

15. The motor device as in claim 13, wherein:

the cylindrical cover part covers both sides of the flange in a direction of insertion of the vehicle-side connector unit.

16. The motor device as in claim 14, wherein:

the cylindrical cover part covers both sides of the enlarged part in a radial direction of the enlarged part.

17. A motor device comprising:

a motor unit including a motor housing having an open end and rotatably supporting a rotary shaft;

a motor-driven unit including a unit housing having an open end that faces the open end of the motor housing and rotatably supporting the rotary shaft; and power supply means having a body and a connector unit integrally formed with each other, the body being interposed between the ends of the motor housing and the unit housing, the connector unit holding connector terminals therein for an electric power supply to the motor unit; and elastic seal means integrally molded on both surfaces of the power supply means where the ends of the motor housing and the unit housing abut, as well as on one side of the connector terminals.

18. The motor device as in claim 17, wherein:

the power supply means further includes brushes connected to the one side of the connector terminals; and the body of the power supply means holds the brushes on one side thereof.

19. The motor device as in claim 18, wherein:

the body of the power supply means has protrusions protruding from another side thereof in an axial direction of the rotary shaft;

the unit housing has protrusions protruding in the axial direction of the rotary shaft to be engaged with the protrusions of the body of the power supply means.

20. The motor device as in claim 19, wherein:

the connector unit has a protrusion protruding in an outward direction perpendicular to the connector terminals; and the elastic seal means is also molded on the protrusion continuously from the one end of the connector terminals.

21. The motor device as in claim 17, wherein:

the elastic seal means has a cylindrical cover part extending from the connector unit in a direction in which the connector unit is open;

and the cylindrical cover part is attached to a panel of a vehicle door.

22. The motor device as in claim 21, wherein:

the connector unit has engagement parts formed on an end surface thereof that faces the panel; and the cylindrical cover part is molded to cover the engagement parts of the connector unit.

23. The motor device as in claim 21, wherein:

the cylindrical cover part includes an end and a flange adjacent the end, so that the end is fit in the insertion hole and the flange abuts the inner panel at an outside of the inner panel.

24. A motor device for a power window of a vehicle that has an inner panel of a door, the inner panel having an insertion hole through which a vehicle-side connector unit is inserted, the motor device comprising:

a motor unit including brushes and a yoke housing;

a gear unit including a gear housing that is assembled to the yoke housing;

a brush holder frame including a body part for holding the brushes thereon and interposed between the yoke housing and the gear housing, and a motor-side connector unit having a holding part and a connecting recess for receiving the vehicle-side connector unit through the insertion hole; and a sealing cover including a body cover part covering the body part, and a cylindrical cover part covering the holding part, wherein the body cover part and the cylindrical cover part are formed continuously and integrally molded to the brush holder frame.

25. The motor device as in claim 24, wherein:

the yoke housing and the gear housing have respective open ends facing each other;

the brush holder frame includes a bridge part between the body part and the motor-side connector unit;

the sealing cover further includes a bridge cover part covering the bridge part;

the body part, the bridge part and the motor-side connector unit are formed integrally as a single member; and the cylindrical cover part is formed in a cylindrical shape so that the connecting recess is open to an inside of the inner panel through the insertion hole.

26. The motor device as in claim 25, wherein:

the brush holder frame is made of a resin;

the sealing cover is made of a material different from that of the brush holder frame; and the brush holder frame and the sealing cover are formed by two-color molding.

27. The motor device as in claim 25, wherein:

the sealing cover is made of one of rubber, elastomer and adhesive resin.

28. The motor device as in claim 25, wherein:

the cylidrical cover part of the sealing cover is fit in the insertion hole of the inner panel.

29. The motor device as in claim 25, wherein:

the body part and the bridge part are provided in correspondance with entire circumferences of the open ends of the yoke housing and the gear housing; and the body cover part and the bridge cover part are provided on the body part and the bridge part to abut the entire circumferences of the open ends of the yoke housing and the gear housing.

30. The motor device as in claim 25, wherein:

the motor-side connector unit includes therein exposed connector terminals having respective ends connected to the brushes; and further comprising a unit cover part for covering the respective ends of the connector terminals continuously with the cylindrical cover part.

31. The motor device as in claim 25, wherein:

the holding part is formed as a flange that extends perpendicularly to a direction of insertion of the vehicle-side connector unit near an opening of the motor-side connector unit.

32. The motor device as in claim 25, wherein:

the holding part is formed as an enlarged part having an inner diameter larger than a diameter of the connecting recess.

33. The motor device as in claim 31, wherein:

the cylindrical cover part covers both sides of the flange in a direction of insertion of the vehicle-side connector unit.

34. The motor device as in claim 32, wherein:

the cylindrical cover part covers both sides of the enlarged part in a radial direction of the enlarged part.

35. A motor device for a power window of a vehicle that has an inner panel of a door, the inner panel having an insertion hole through which a vehicle-side connector unit is inserted, the motor device comprising:

a motor unit including brushes and a yoke housing;

a gear unit including a gear housing that is assembled to the yoke housing;

a brush holder frame including a body part for holding the brushes thereon and interposed between the yoke housing and the gear housing, and a motor-side connector unit having a holding part and a connecting recess for receiving the vehicle-side connector unit through the insertion hole; and a sealing cover including a body cover part covering the body part, and a cylindrical cover part covering the holding part, wherein the body cover part and the cylindrical cover part are made of a same material and integrally molded with the brush holder frame.

36. The motor device as in claim 35, wherein:

the yoke housing and the gear housing have respective open ends facing each other;

the brush holder frame includes a bridge part between the body part and the motor-side connector unit;

the sealing cover further includes a bridge cover part covering the bridge part;

the body part, the bridge part and the motor-side connector unit are formed integrally as a single member; and the cylinder cover part is formed in a cylindrical shape so that the connecting recess is open to an inside of the inner panel through the insertion hole.

37. The motor device as in claim 36, wherein:

the brush holder frame is made of a resin;

the sealing cover is made of a material different from that of the brush holder frame; and the brush holder frame and the sealing cover are formed by two-color molding.

38. The motor device as in claim 36, wherein:

the sealing cover is made of one of rubber, elastomer and adhesive resin.

39. The motor device as in claim 36, wherein:

the cylindrical cover part of the sealing cover is fit in the insertion hole of the inner panel.

40. The motor device of claim 36, wherein:

the body part and the bridge part are provided in correspondence with entire circumferences of the open ends of the yoke housing and the gear housing; and the body cover part and the bridge cover part are provided on the body part and the bridge part to abut the entire circumferences of the open ends of the yoke housing and the gear housing.

41. The motor device as in claim 35, wherein:

the motor-side connector unit includes therein exposed connector terminals having respective ends connected to the brushes; and further comprising:

a unit cover part for covering the respective ends of the connector terminals continuously with the cylindrical cover part.

42. The motor device as claimed in claim 35, wherein:

the holding part is formed as a flange that extends perpendicularly to a direction of insertion of the vehicle-side connector unit near an opening of the motor-side connector unit.

43. The motor device as claimed in claim 35, wherein:

the holding part is formed as an enlarged part having an inner diameter larger than a diameter of the connecting recess.

44. The motor device as in claim 42, wherein:

the cylindrical cover part covers both sides of the flange in a direction of insertion of the vehicle-side connector.

45. The motor device in claim 43, wherein:

the cylindrical cover part covers both sides of the enlarged part in a radial direction of the enlarged part.

* * * * *